United States Patent
Chan

(10) Patent No.: US 9,254,747 B2
(45) Date of Patent: Feb. 9, 2016

(54) WHEEL CLUTCH DEVICE OF A ROLLATOR

(71) Applicant: Shu-Chen Chan, Changhua County (TW)

(72) Inventor: Shu-Chen Chan, Changhua County (TW)

(*) Notice: Subject to any disclaimer, the term of this patent is extended or adjusted under 35 U.S.C. 154(b) by 150 days.

(21) Appl. No.: 14/198,065

(22) Filed: Mar. 5, 2014

(65) Prior Publication Data

US 2015/0251535 A1 Sep. 10, 2015

(51) Int. Cl.
  *F16D 11/10* (2006.01)
  *B60K 23/08* (2006.01)
  *F16D 11/14* (2006.01)

(52) U.S. Cl.
  CPC ............... *B60K 23/08* (2013.01); *F16D 11/14* (2013.01)

(58) Field of Classification Search
  CPC ............................... B60K 23/08; F16D 11/14
  See application file for complete search history.

(56) References Cited

U.S. PATENT DOCUMENTS

| | | | | |
|---|---|---|---|---|
| 5,018,597 A * | 5/1991 | Wakabayashi | ..... | B60K 17/3515 180/247 |
| 5,353,890 A * | 10/1994 | Clohessy | ........... | B60K 17/3515 180/247 |
| 2007/0284211 A1* | 12/2007 | Tin | .......... | F16D 11/10 192/69.4 |
| 2012/0132499 A1* | 5/2012 | Brown | .................... | F16D 1/072 192/69.4 |
| 2013/0256079 A1* | 10/2013 | Eluard | .................... | F16D 11/14 192/69.5 |
| 2015/0045184 A1* | 2/2015 | Nishimoto | ............. | B60K 23/08 477/75 |

* cited by examiner

*Primary Examiner* — David J Hlavka
(74) *Attorney, Agent, or Firm* — LaRiviere, Grubman PC

(57) ABSTRACT

A wheel clutch device has two hubs, a shaft module, an engagement base, a clutch base, a clutch unit, and an abutment unit. The shaft module is inserted through the hubs and has a shaft body. The engagement base is mounted on one of the hubs and has at least one engagement base groove. The clutch base is mounted in the engagement base engaged with the shaft body and has at least one alignment slit aligned with the at least one engagement base groove. The clutch unit is mounted around the clutch base and has at least one engagement lump selectively engaged with the at least one engagement base groove and the at least one alignment slit. The abutment unit is combined with the shaft body and abuts the clutch wilt.

7 Claims, 10 Drawing Sheets

WHEEL CLUTCH DEVICE OF A ROLLATOR

BACKGROUND OF THE INVENTION

1. Field of the Invention

The present invention relates to a clutch device, and more particularly to a wheel clutch device of a rollator.

2. Description of Related Art

A conventional rollator has a body, two rear wheels, a front wheel, and a transmission module. The body has a bottom frame and a handle. The handle is mounted on a front side of the bottom frame. The rear wheels are rotatably mounted on a rear side of the bottom frame. The front wheel is rotatably mounted on the front side of the bottom frame, and a steering direction of the front wheel can be controlled by the handle. The transmission module is mounted on the bottom frame and has a cell, two motors, and two gear modules. The motors are electrically connected with the cell and are respectively mounted on the rear wheels. The gear modules are respectively connected between a gear module and a corresponding rear wheel. The motors drive the corresponding rear wheel by the gear module, such that the rollator can move forward.

When the cell is short of electrical power, a user needs to manually push the rollator to move. However, the rear wheels cannot be rotated since the rear wheels are mechanically braked by the gear modules to keep from sliding. Therefore, it is laborious for the user to push the rollator to move, particularly for the user who has reduced mobility or is senior in age.

SUMMARY OF THE INVENTION

The main objective of the present invention is to provide an improved wheel clutch device of a rollator to resolve the afore-mentioned problems.

The wheel clutch device has two hubs, a shaft module, an engagement base, a clutch base, a clutch unit, and an abutment unit.

The hubs abut each other. The shaft module is inserted through the hubs and has a shaft body inserted through the hubs and a shaft engagement block mounted in the shaft body.

The engagement base is mounted on a corresponding one of the hubs at a position opposite to the other hub and has at least one engagement base groove radially formed in the engagement base.

The clutch base is mounted on a side of the engagement base and has a clutch pad, a mounting collar and at least one alignment slit. The clutch pad is mounted in the engagement base. The mounting collar is formed on a side of the clutch pad, mounted around the shaft body, and engages with the shaft engagement block. The least one alignment slit is formed in a side of the clutch pad and aligned with the at least one engagement base groove.

The clutch unit is mounted around the clutch base and has at least one engagement lump formed on a side of the clutch unit and selectively engaged with the at least one engagement base groove and the at least one alignment slit.

The abutment unit is mounted on the shaft body and has a cover and a spring. The cover is combined with the shaft body. The spring is mounted around the clutch base and abuts between the cover and the clutch unit.

Other objectives, advantages and novel features of the present invention will become more apparent from the following detailed description when taken in conjunction with the accompanying drawings.

DETAILED DESCRIPTION OF PREFERRED EMBODIMENT

Figure 1:
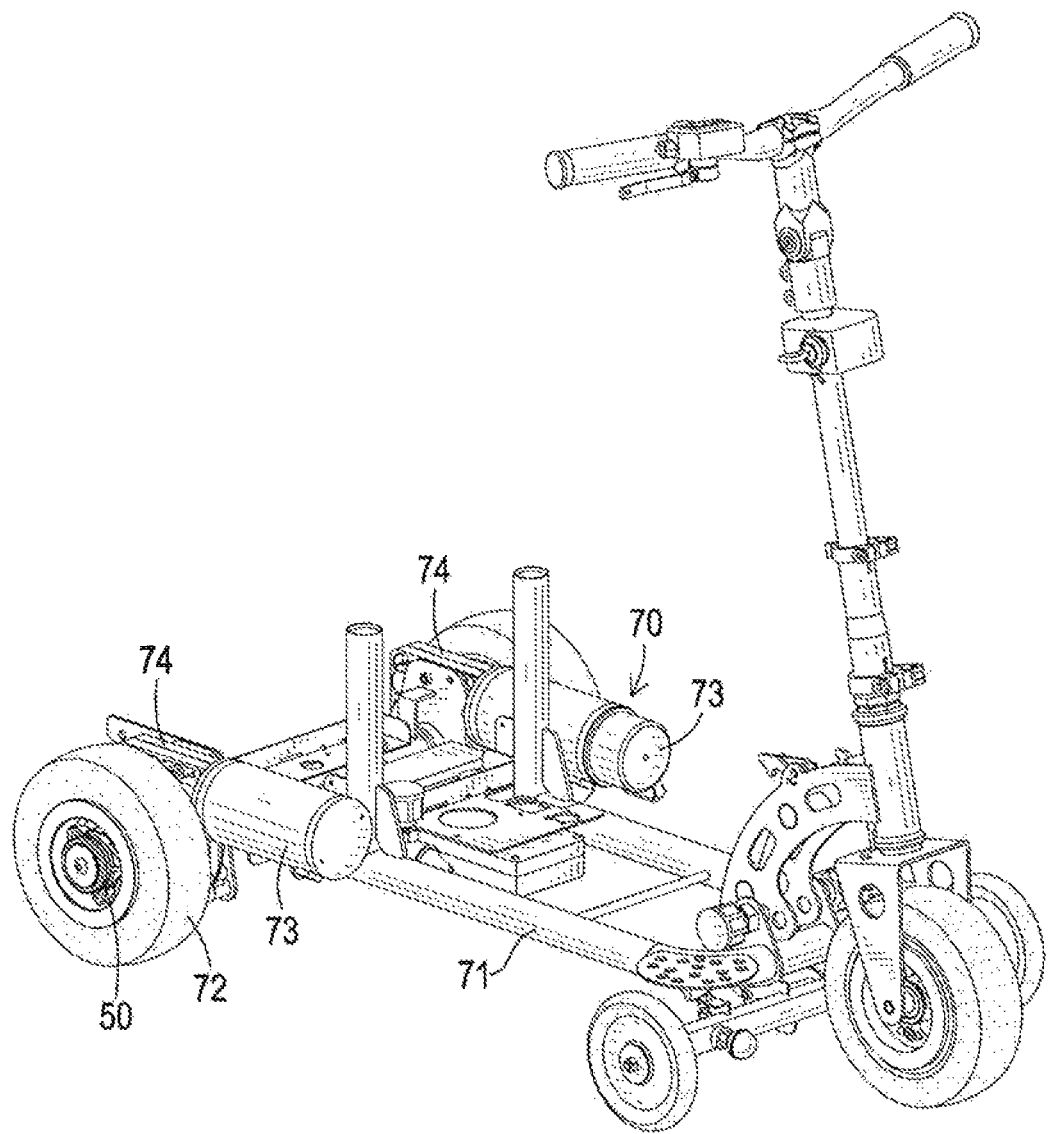
FIG. 1 is a perspective view of a first preferred embodiment of a wheel clutch device in accordance with the present invention mounted on a rollator.
Figure 2:
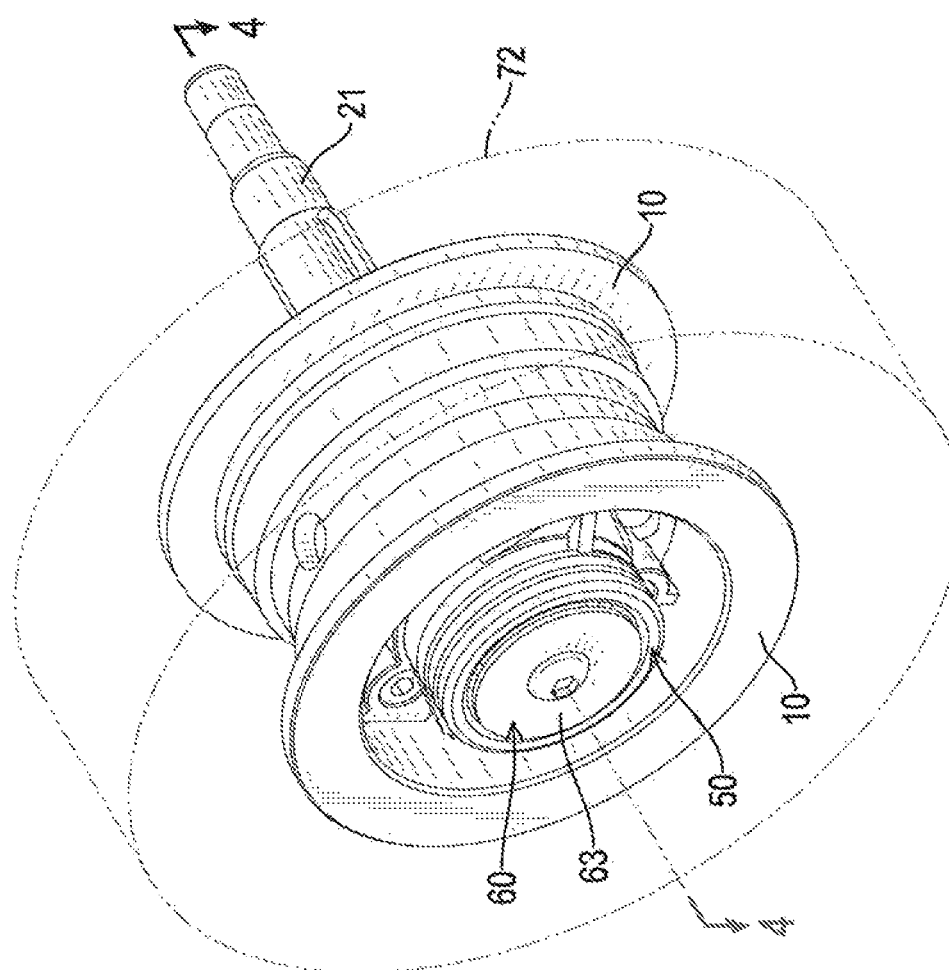
FIG. 2 is an enlarged perspective view of the wheel clutch device in FIG. 1.
Figure 3:
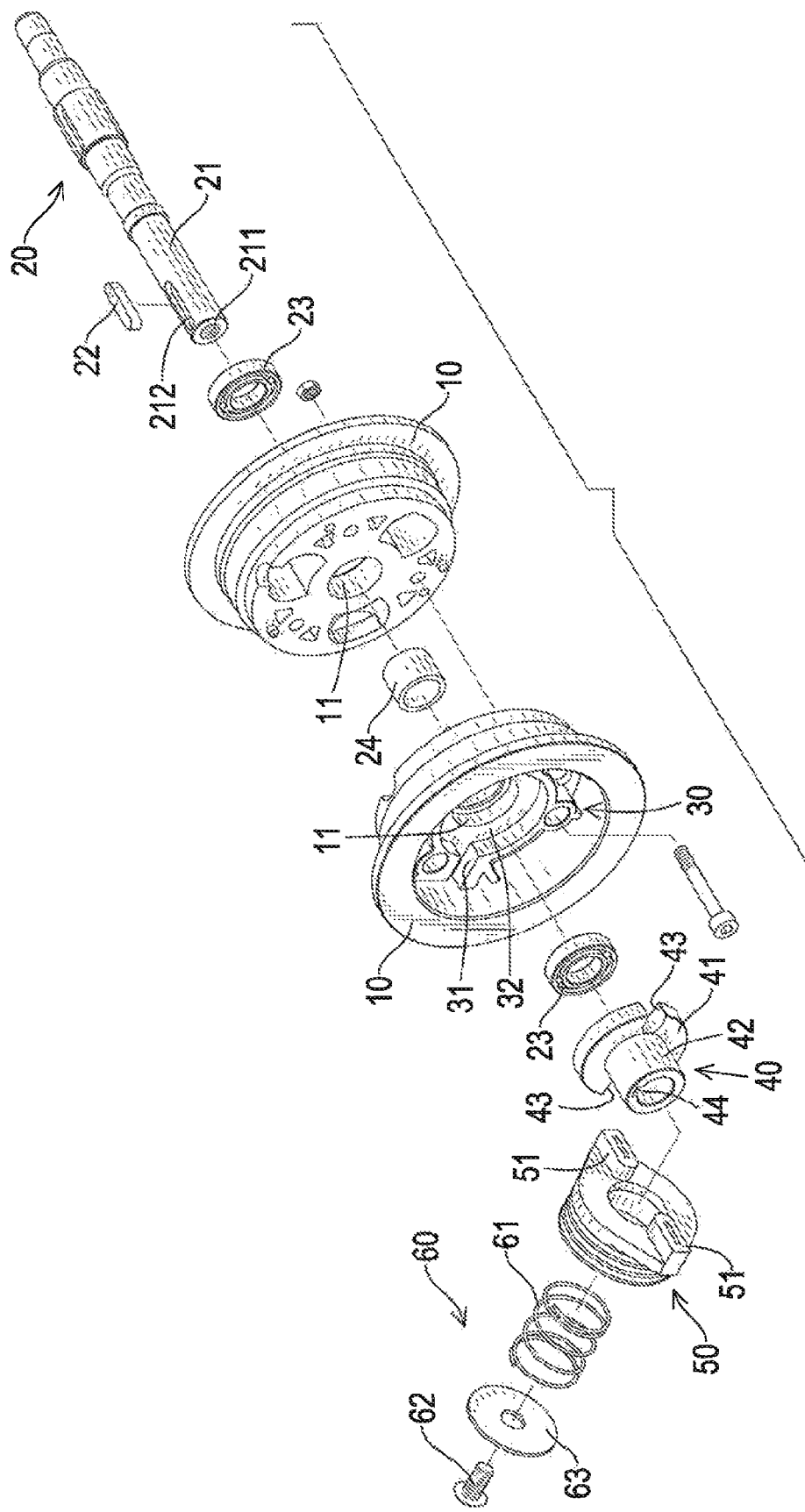
FIG. 3 is an exploded perspective view of the wheel clutch device in FIG. 2.

With reference to FIGS. 1 to 3, a first preferred embodiment of a wheel clutch device in accordance with the present invention is mounted on a rollator 70. The rollator 70 has a bottom frame 71, two rear wheel bodies 72, two motors 73 and two gear modules 74, wherein two wheel clutch devices of the present invention are respectively mounted in the two rear wheel bodies 72. The wheel clutch device has two hubs 10, a shaft module 20, an engagement base 30, a clutch base 40, a clutch unit 50 and an abutment unit 60.

The hubs 10 are hollow, abut and are combined with each other. One of the rear wheel bodies 72 is mounted around the hubs 10. Each hub 10 has a shaft hole 11 formed through the hub 10. The shaft holes 11 of the hubs 10 are aligned with each other.

Figure 4:
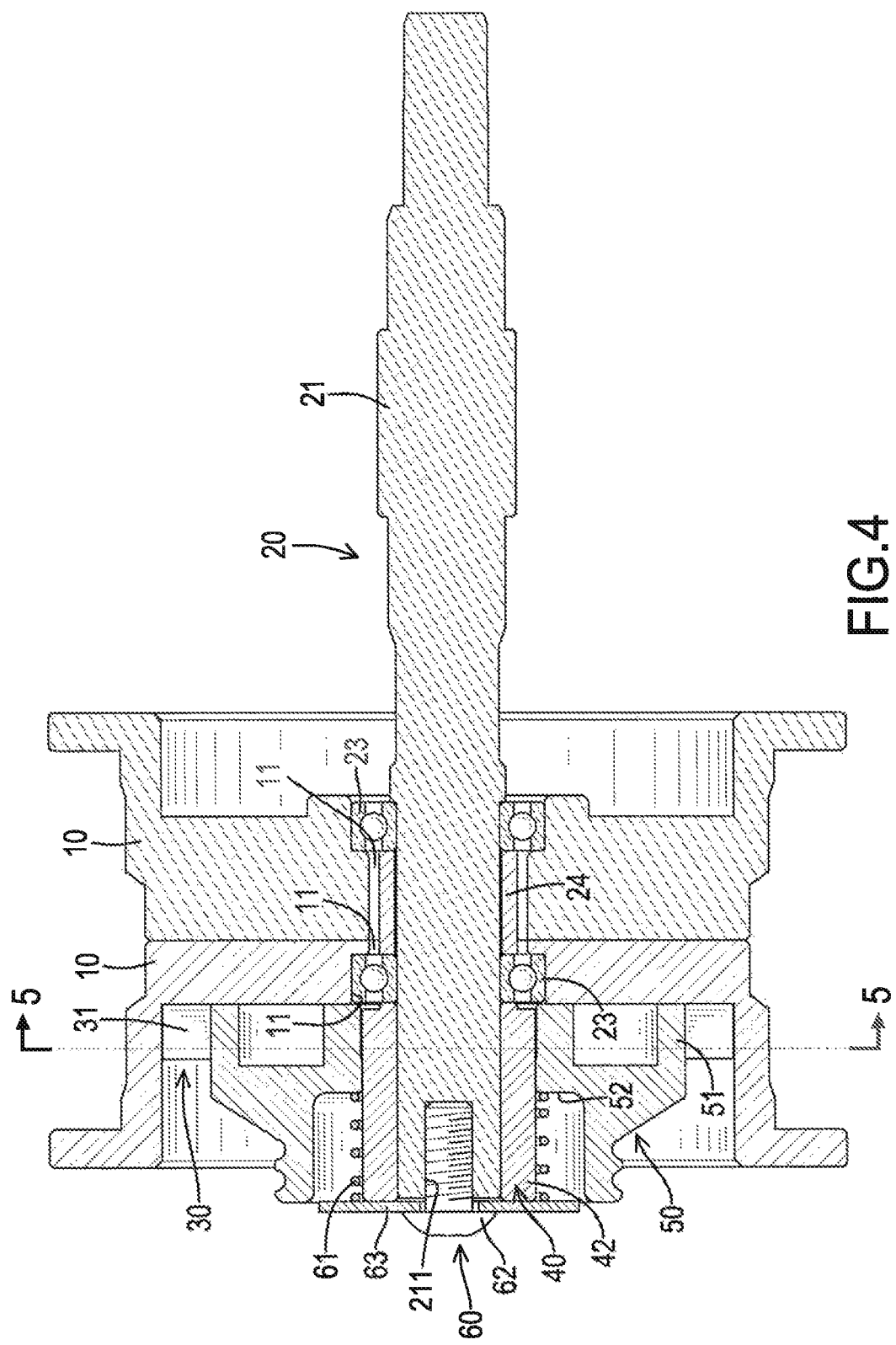
FIG. 4 is a side view in partial section of the wheel clutch device along line 4-4 in FIG. 2.
Figure 5:
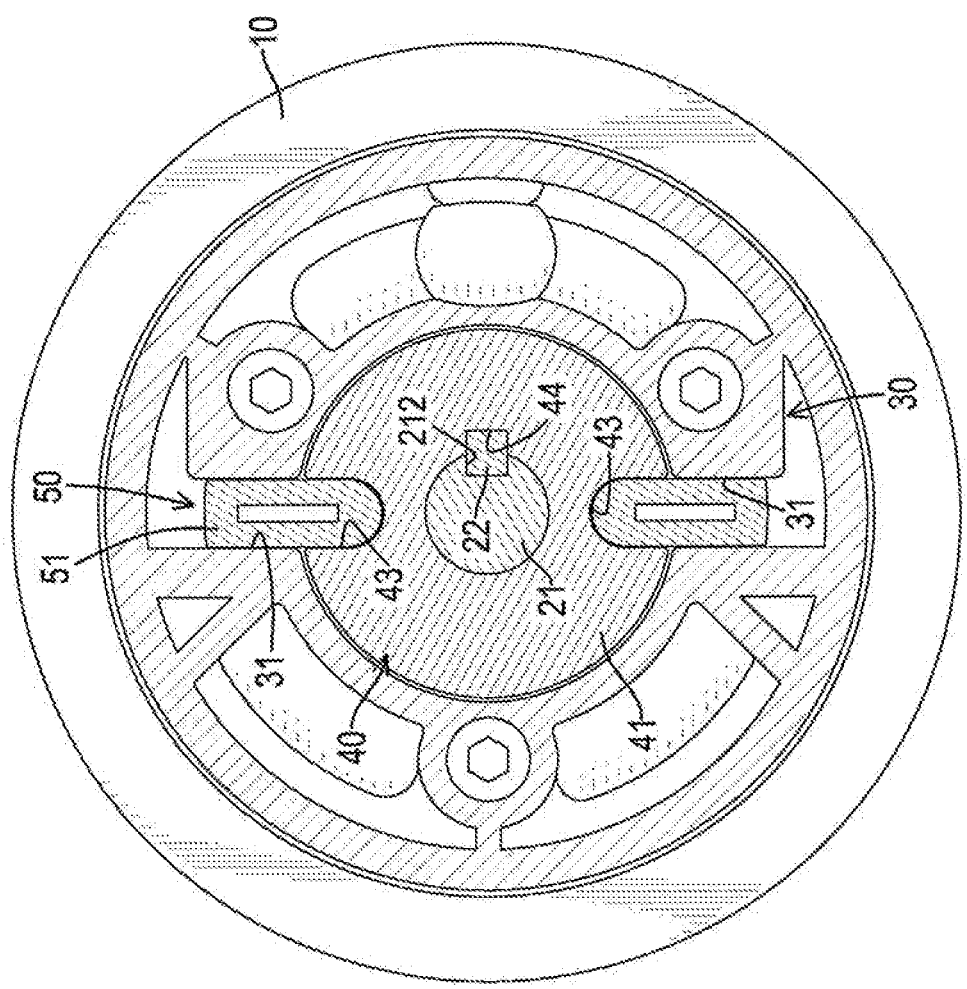
FIG. 5 is a cross sectional front view of the wheel clutch device along the 5-5 line in FIG. 4.

With reference to FIGS. 3 to 5, the shaft module 20 is inserted through the shaft holes 11 of the hubs 10 and has a shaft body 21, a shaft engagement block 22, two bearings 23 and a supporting tube 24. The shaft body 21 is inserted through the shaft holes 11 and has a combining hole 211 and a shaft engagement recess 212. The combining hole 211 is formed in an end of the shaft body 21. The shaft engagement recess 212 is formed in the shaft body 21 and is adjacent to the combining hole 211. The shaft engagement block 22 is mounted in the shaft engagement recess 212. The bearings 23 are mounted around the shaft body 21, are respectively located in the hubs 10, and respectively abut the hubs 10. The supporting tube 24 is mounted around the shaft body 21 and is located between the bearings 23.

The engagement base 30 is formed on one of the hubs 10 and is located at a position opposite to the other hub 10. The engagement base 30 has two engagement base grooves 31 and a clutch base recess 32. The engagement base grooves 31 are radially and symmetrically formed in the engagement base 30. The clutch base recess 32 is formed in the corresponding hub 10 at a side opposite to the other hub 10 and communicates with the engagement base grooves 31.

The clutch base 40 is hollow, is mounted around the shaft body 21, is mounted in the clutch base recess 32 and has a clutch pad 41, a mounting collar 42, two alignment slits 43 and an engagement recess 44. The clutch pad 41 is mounted in the clutch base recess 32. The mounting collar 42 is formed on a side of the clutch pad 41 and is mounted around the shaft body 21. The alignment slits 43 are symmetrically formed in the clutch pad 41 and can be respectively aligned and communicate with the engagement base grooves 31. The engagement recess 44 is formed in an inner surface of the mounting collar 42 and is engaged with the shaft engagement block 22, such that the clutch base 40 and the shaft body 21 can cooperate with each other by a non-circular cross section to achieve a synchronous rotation purpose.

The clutch unit 50 is mounted around the mounting collar 42 and has two engagement lumps 51 and an abutment unit recess 52. The engagement lumps 51 are formed on a side of the clutch unit 50 that faces the clutch base 40 and are respectively inserted into the alignment slits 43 and respectively inserted into the engagement base grooves 31. The abutment unit recess 52 is formed in the clutch unit 50 at a side opposite to the engagement lumps 51.

The abutment unit 60 is mounted in the abutment unit recess 52 and has a spring 61, a combining unit 62 and a cover 63. The spring 61 is mounted around the shaft body 21 and abuts the clutch unit 50. The combining unit 62 is combined with the combining hole 211 by threads. The cover 63 is mounted around the combining unit 62, is clamped by the combining unit 62 and the shaft body 21, and abuts the spring 61.

With reference to FIGS. 1, 3, 4, and 5, in use, the two alignment slits 43 and the two engagement base grooves 31 are respectively aligned with each other, and each engagement lump 51 is inserted into the corresponding alignment slit 43 and the corresponding engagement base groove 31. The shaft body 21 is driven by the motor 73 and the gear module 74. When the motor 73 is operated, the gear module 74 is driven by the motor 73 to drive the shaft body 21 to rotate. When the clutch base 40 is rotated, the hubs 10 and the clutch unit 50 are also rotated by the clutch base 40. The corresponding rear wheel body 72 is rotated by the hubs 10, such that the rollator can be moved.

Figure 6:
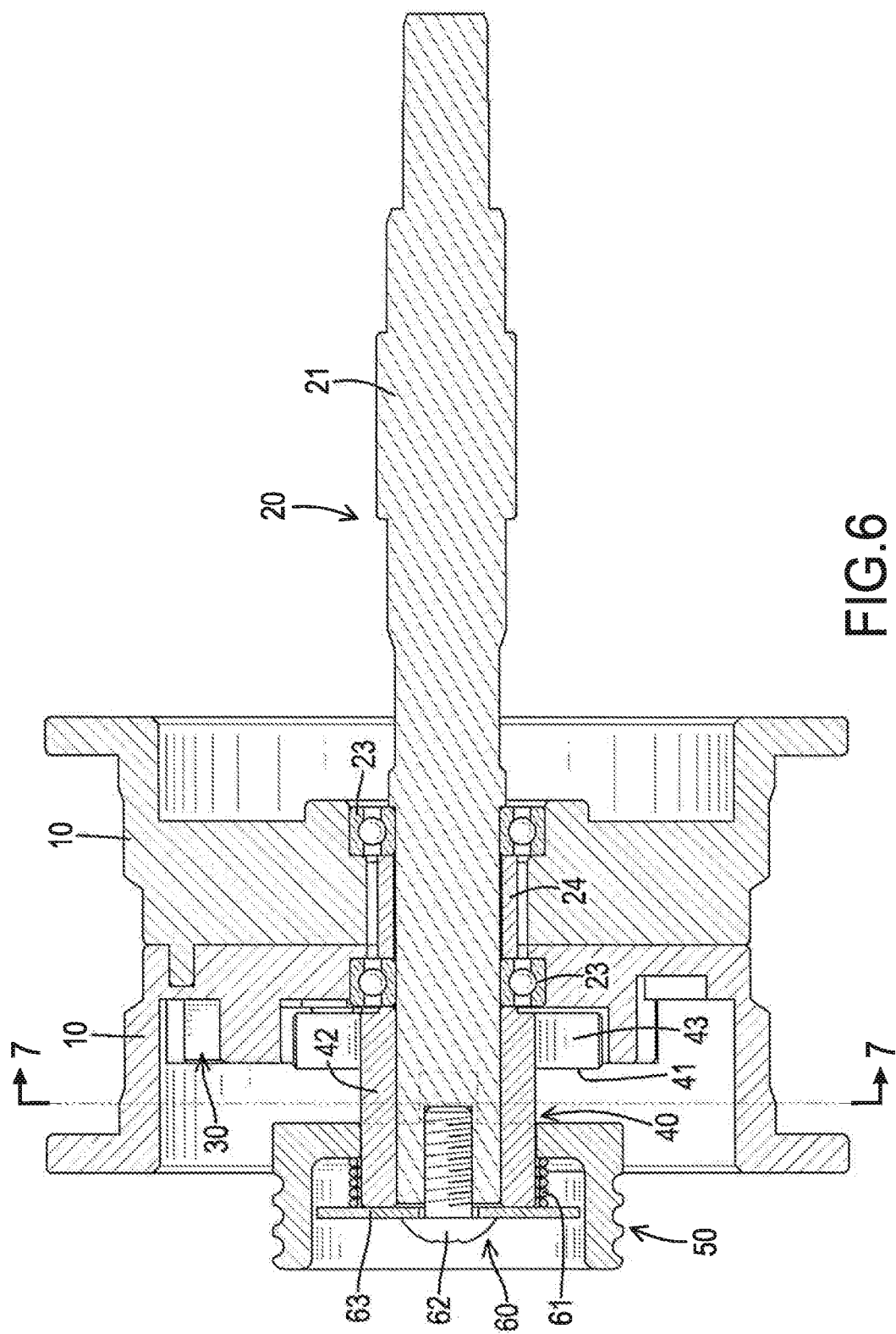
FIG. 6 is a cross sectional side view in partial section of the wheel clutch device in FIG. 2.
Figure 7:
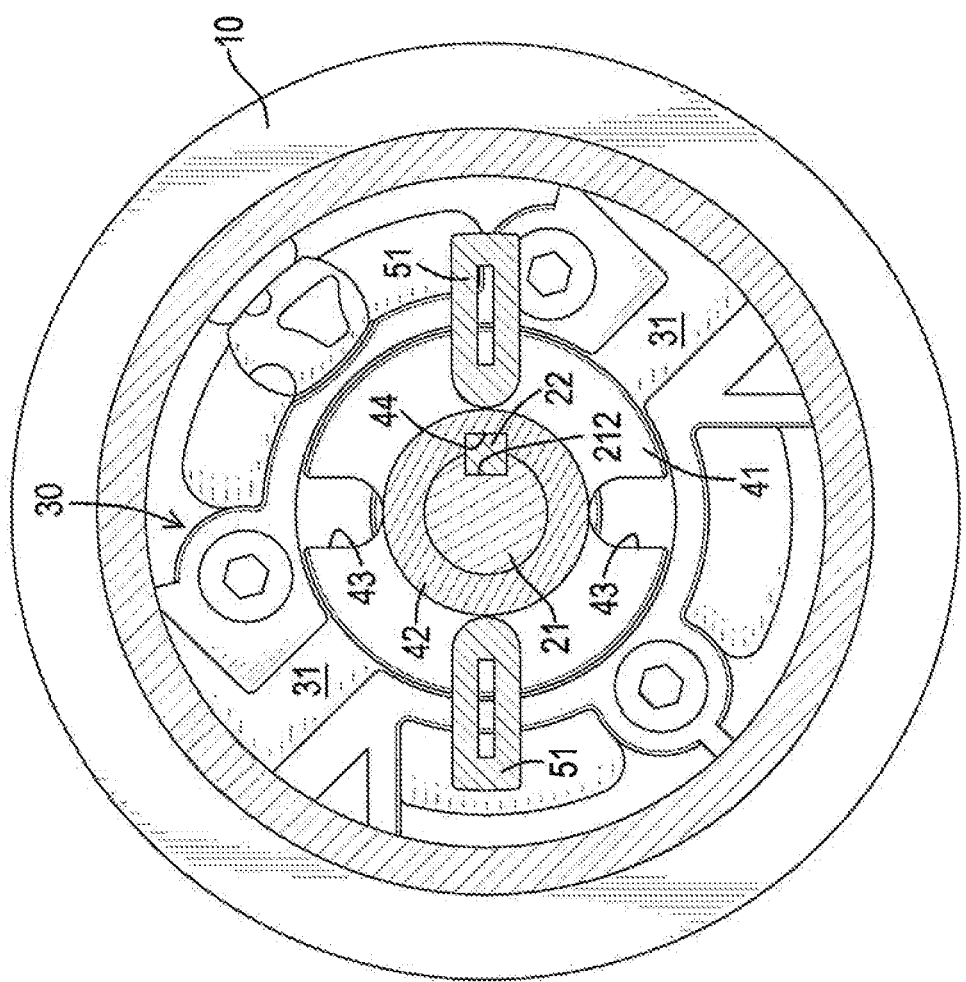
FIG. 7 is an operational cross sectional front view of the wheel clutch device along line 7-7 in FIG. 6.

With reference to FIGS. 1, 6, and 7, when the rollator cannot be moved due to power shortage of the cell and has to be manually pushed by a user, the operation state of the rear wheel bodies 72 must be idle relative to the gear nodules 74 and the motors 73. First, the clutch unit 50 is pulled away from the clutch base 40 and is rotated relative to the clutch base 40 until the two engagement lumps 51 are detached from the engagement slits 43 and the engagement base grooves 31. Then, the rear wheel body 72 can be rotated without affecting the clutch unit 50 and the hubs 10. Therefore, when the rear wheel body 72 is rotated, the clutch base 40 is maintained at a fixed status, such that the shaft body 21 can be maintained at a fixed status as well. The rotation of the rear wheel body 72 cannot cause the shaft body 21 to rotate, so the rotation of the rear wheel body 72 cannot be affected by the gear module 74 and the rear wheel body 72 can be rotated smoothly.

After the rollator is pushed to a destination, the clutch unit 50 is rotated to align the engagement base grooves 31 with the engagement lumps 51. Then, the rollator is slightly pushed for a short distance until the alignment slits 43 are respectively aligned with the engagement base grooves 31. When each alignment slit 43 is aligned with the corresponding engagement base groove 31, the clutch unit 50 is not blocked by the clutch pad 41. The spring 61 presses the clutch unit 50 inward, such that the engagement lumps 51 can be engaged with the alignment slits 43 and the engagement base grooves 31. Therefore, the wheel clutch device can return to an original state relative to the rollator.

Figure 8:
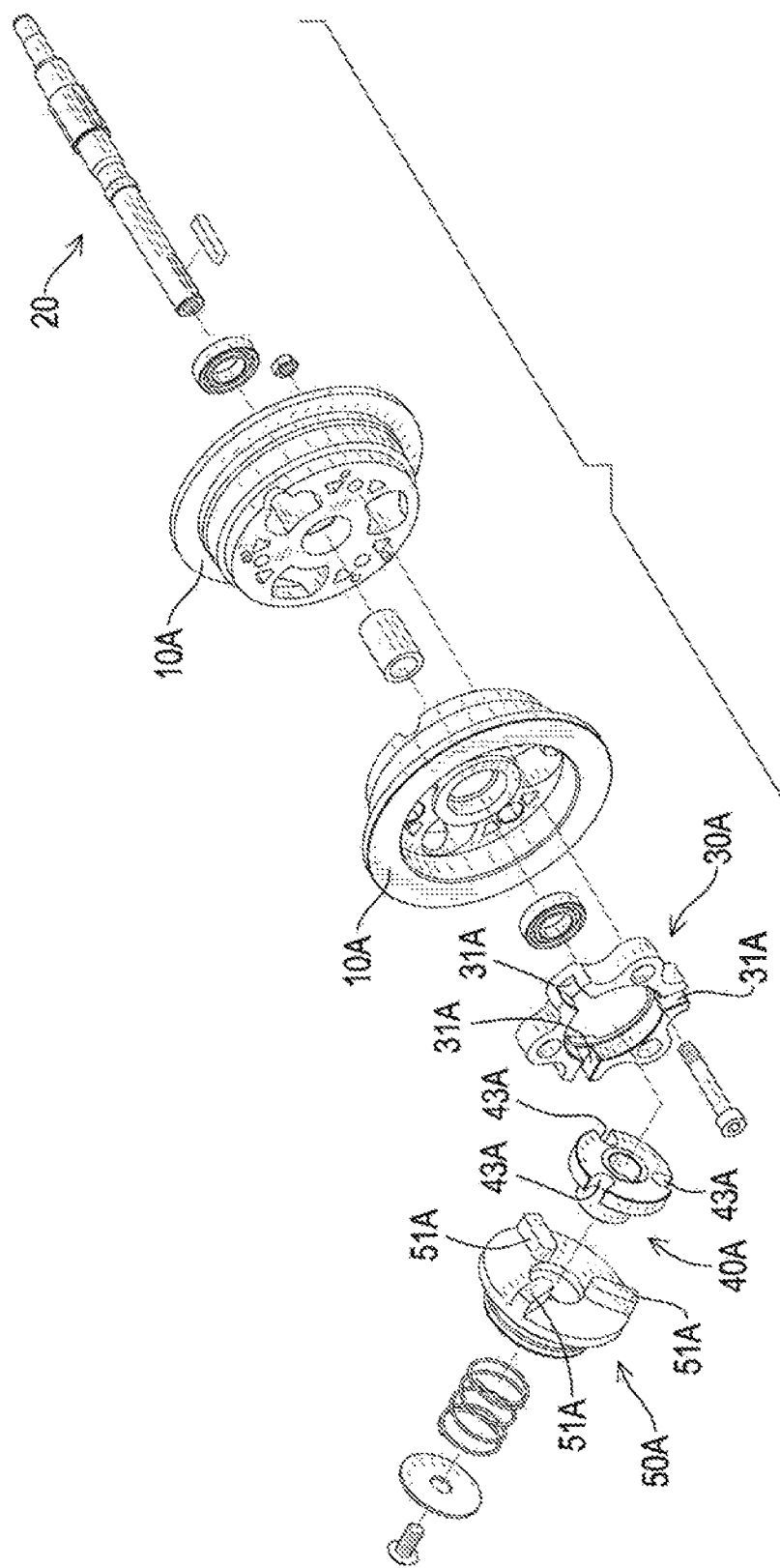
FIG. 8 is an exploded perspective view of a second preferred embodiment of a wheel clutch device in accordance with the present invention.
Figure 9:
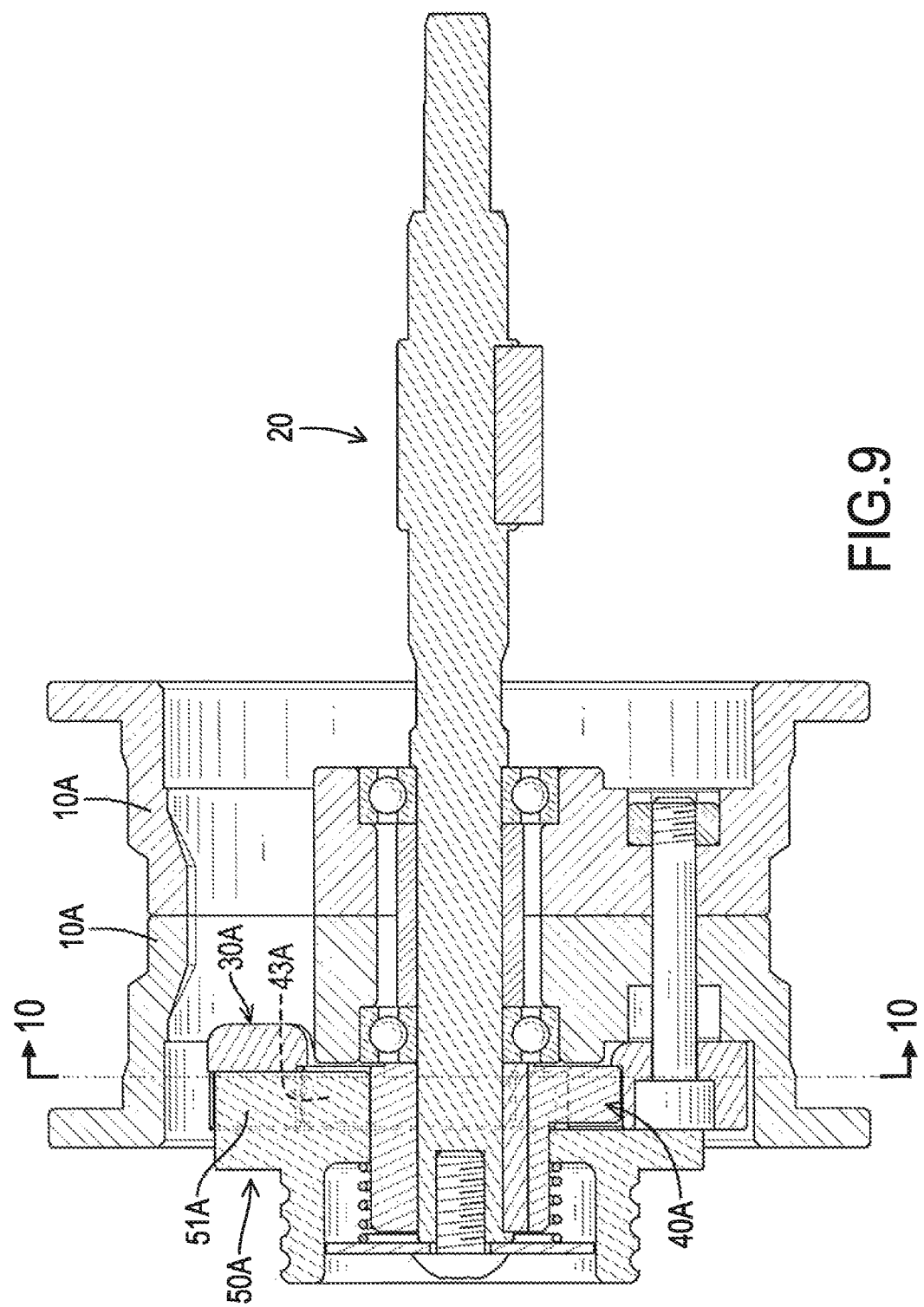
FIG. 9 is a side view in partial section of the wheel clutch device in FIG. 8.
Figure 10:
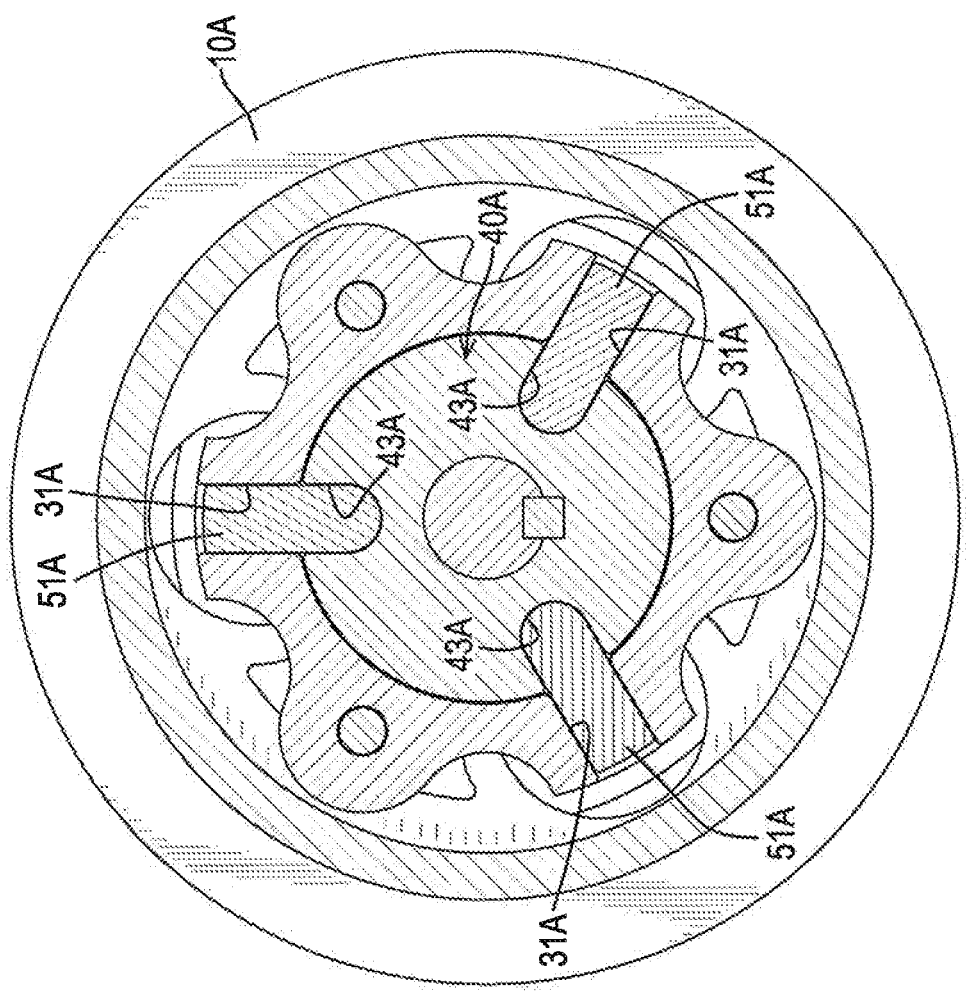
FIG. 10 is a cross sectional front view of the wheel clutch device along line 10-10 in FIG. 9.

With reference to FIGS. 8 to 10, a second preferred embodiment of the Wheel clutch device in accordance with the present invention has two hubs 10A, a shaft module 20, an engagement base 30A, a clutch base 40A and a clutch unit 50A.

The engagement base 30A is detachably mounted on a side of one of the hubs 10A and has three engagement base grooves 31A. The clutch base 40A is mounted in the engagement base 30A and on a corresponding hub 10A. The clutch base 40A has three alignment slits 43A respectively aligned with the engagement base grooves 31A. The Shaft module 20 is inserted through the hubs 10A and the engagement base 30A, and is engaged with the clutch base 40A. The clutch unit 50A is mounted in the corresponding hub 10A and around the clutch base 40A. The clutch unit 50A has three engagement lumps 51A respectively aligned and engaged with the engagement base grooves 31A and the alignment slits 43A.

From the above description, it is noted that the present invention has the following advantages:

When the rollator needs to be manually pushed forward by the user, the rear wheel body 72 is controlled to be idle relative to the rollator by the clutch unit 50. The clutch unit 50 is pulled away from the hubs 10 and then is rotated relative to the shaft body 21. Then, when the engagement lumps 51 are disengaged from the alignment slits 43 and the engagement base grooves 31, the hubs 10 are idle relative to the shaft body 21, such that the rear wheel body 72 is idle relative to the motor 72 and the gear module 74. Therefore, the rollator can be pushed smoothly by the user.

After the rollator arrives at the destination, the clutch unit 50 is rotated again, and then the engagement lumps 51 are respectively aligned with the engagement base grooves 31. The rollator is then pushed forward for a short distance to rotate the clutch base 40. When the clutch base 40 is rotated, the alignment slits 43 are also rotated to respectively align with the engagement lumps 51 and with the engagement base grooves 31. Then, the engagement lumps 51 are pressed by the spring 61 to be engaged with the alignment slits 43 and the engagement base grooves 31. Therefore, the wheel clutch device is recovered to the original state, such that it is convenient for the user to use the wheel clutch device.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A wheel clutch device of a rollator having:
two hubs abutting each other;
a shaft module inserted through the hubs and having
   a shaft body inserted through the hubs; and
   a shaft engagement block mounted in the shaft body;
an engagement base mounted on a corresponding one of the hubs at a position opposite to the other hub and having at least one engagement base groove radially formed in the engagement base;
a clutch base mounted on a side of the engagement base and having
   a clutch pad mounted in the engagement base;
   a mounting collar formed on a side of the clutch pad, mounted around the shaft body, and engaged with the shaft engagement block; and at least one alignment slit formed in a side of the clutch pad and aligned with the at least one engagement base groove;

a clutch unit mounted around the clutch base and having at least one engagement lump, the engagement lump formed on a side of the clutch unit and selectively engaged with the at least one engagement base groove and the at least one alignment slit; and an abutment unit mounted on the shaft body and having
a cover combined with the shaft body; and
a spring mounted around the clutch base and abutting between the cover and the clutch unit.

2. The wheel clutch device of a rollator as claimed in claim 1, wherein the engagement base is integrally formed on the corresponding hub.

3. The wheel clutch device of a rollator as claimed in claim 2, wherein the engagement base has two engagement base grooves, the clutch base has two alignment slits, and the clutch unit has two engagement lumps.

4. The wheel clutch device of a rollator as claimed in claim 1, wherein the engagement base is detachably mounted on the corresponding hub.

5. The wheel clutch device of a rollator as claimed in claim 2, wherein the engagement base is detachably mounted on the corresponding hub.

6. The wheel clutch device of a rollator as claimed in claim 4, wherein the engagement base has three engagement base grooves, the clutch base has three alignment slits, and the clutch unit has three engagement lumps.

7. The wheel clutch device of a rollator as claimed in claim 5, wherein the engagement base has three engagement base grooves, the clutch base has three alignment slits, and the clutch unit has three engagement lumps.

* * * * *